Jan. 15, 1952  R. P. L. M. DAVID  2,582,531
RAPID RESPONSE, DIRECT CURRENT GENERATOR
Filed July 25, 1945
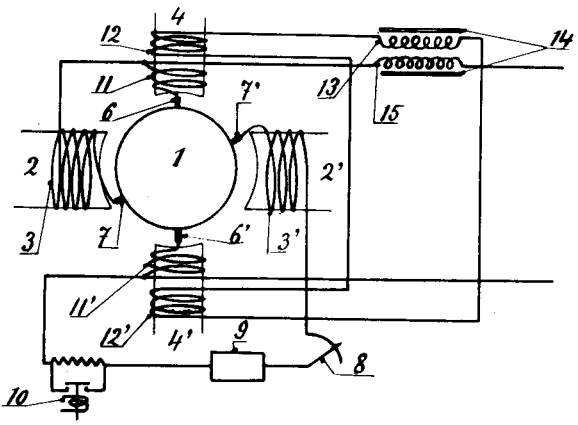
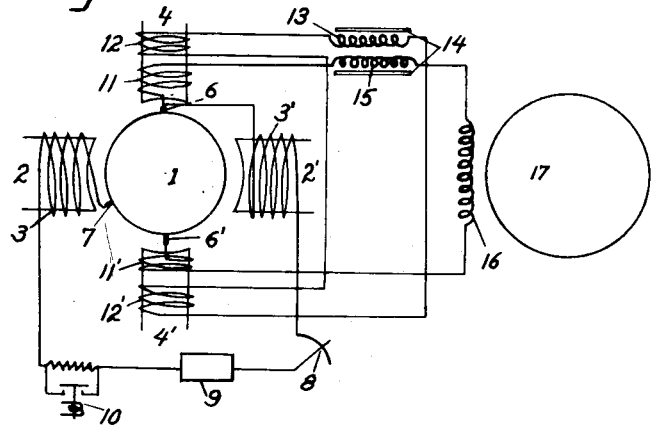
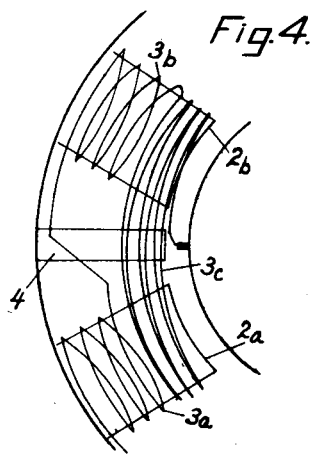
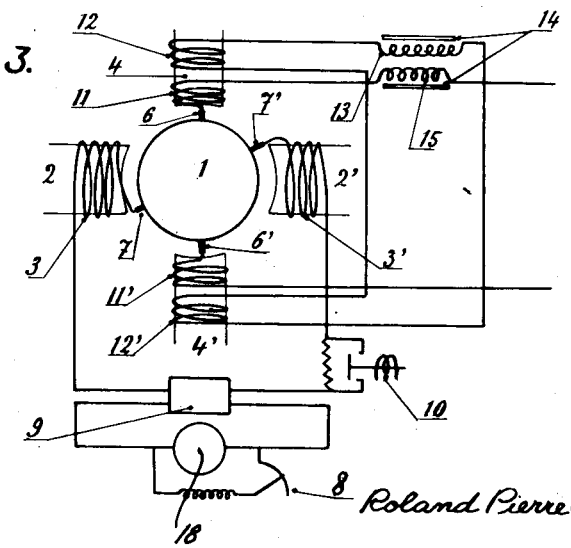
Inventor
Roland Pierre Leopold Marie David
By Cameron, Kerkam & Sutton
Attorneys Patented Jan. 15, 1952

2,582,531

UNITED STATES PATENT OFFICE 2,582,531

RAPID RESPONSE DIRECT CURRENT GENERATOR

Roland Pierre Léopold Marie David, Paris, France, assignor to Le Materiel Electrique S. W., Paris, France, a joint-stock company of France Application July 25, 1945, Serial No. 607,063
In France July 8, 1943

Section 1, Public Law 690, August 8, 1946
Patent expires July 8, 1963

3 Claims. (Cl. 322—53)

The present invention has for its object rapid response direct current generators which besides a normal armature comprise, between their main field poles, an even number of supplementary poles carrying a winding which is traversed by the current delivered by the generator. In addition, they possess, on their commutator, between the main brushes, either a single auxiliary brush, which is connected to one end of a winding carried by the main poles, the other end of which winding is connected to a main brush, or one or more pairs of auxiliary brushes, the brushes of each polarity being connected to an end of a winding carried by the main poles of the generator and already traversed by the normal shunt or separate exciting current, so that they introduce into said winding the stepping-up or stepping-down electromotive force induced, between the auxiliary brush and a main brush (when a single auxiliary brush is used) or between the auxiliary brushes (when several are used), by the flux issuing from the supplementary poles, said flux, according to the invention, being influenced by means of additional exciting windings carried by said supplementary poles and traversed by currents issuing from one or more suitably selected external sources.

Moreover, it is necessary that the number of turns of the field winding into which the aforesaid electro-motive force is introduced be great enough, and that the current which traverses it be weak enough for the magnetomotive force of the armature reaction engendered by said current being practically negligible and without any appreciable influence on the flux and the E. M. F. between the main brushes; otherwise, the generator must be provided with a compensating winding adapted to nullify such influence.

The machines which are the subject of the invention may be used as exciters and, more generally, as rapid response generators. But they can also, simultaneously, be provided with a high amplification factor if their main field coils are energized by a current of medium strength at a voltage low enough for assuring that the flux issuing from the supplementary poles has a small value.

A number of embodiments of the invention are shown diagrammatically in the accompanying drawing by way of examples.

In the drawing:

Fig. 1 shows a direct current generator provided with two main poles, two supplementary poles and a single auxiliary brush;

Fig. 2 shows a similar machine which, however, is provided with two auxiliary brushes;

Fig. 3 also shows a machine analogous to that of Fig. 1 but which, in addition, is provided with a separate excitation; and Fig. 4 shows a detail of execution of an embodiment in which the main poles are subdivided, a commutation pole being interposed between the two half-poles;

In the figures referred to, and for the purpose of simplifying the showing, it is assumed that the armature is of the ring-wound type; it will be understood, however, that the winding may also be of the drum-wound type, which, in most cases, is considered preferable.

As shown in Fig. 1, the generator comprises, in addition to a usual armature, 1, two main poles 2, 2' on which is disposed a field winding 3, 3', two supplementary poles 4, 4' the cross section of which is sufficient to permit passage of a flux substantially equal to that which traverses the field poles, such poles lying between the main poles at the places usually occupied by the commutation poles, and which carry a suitable cross winding 11, 11' traversed by the current delivered by the generator. Furthermore, independently of its main brushes 6, 6' (which are disposed substantially at right angles to the axis of the main poles), said generator is provided with an auxiliary or exciting brush 7 of small cross section and preferably having a rather high contact resistance, said brush being disposed approximately opposite one of the supplementary poles. Brush 7 is connected to one end of the field winding 3, 3', the other end of which is connected to the main brush 6. Winding 3, 3' has a number of turns which is great enough and the current which traverses it is weak enough for the magnetomotive force of the armature reaction engendered by said current being practically negligible and without any appreciable influence on the flux and the E. M. F. between the main brushes. In the case of that condition being not fulfilled, the generator must be provided with a compensating winding nullifying that influence of the armature reaction of the exciting current, as mentioned above.

The winding 11, 11' compensates the armature reaction of the current delivered by the generator and acts as the usual commutation winding.

One may, of course, if need be, utilize a distributed compensating winding to nullify the effect of the armature reaction of the current delivered by the machine.

All of the usual types of accessory devices such as rheostat 8, any suitable regulator 9, special relay or regulator 10 (called "impulse relay" or "impulse regulator"), etc., may be connected in the field circuit.

According to the invention, an additional winding 12, 12' is provided on the supplementary poles 4, 4', in addition to the winding 11, 11'. Said additional winding, closed upon itself, is fed by the secondary 13 of an air-gap transformer 14, the primary 15 of which is traversed by the current delivered by the generator.

The field winding 16 of the machine 17 which is excited by the generator is connected to the winding 11, 11' across the above mentioned primary winding 15. It is evident that, when transient variations occur in the field winding 16 and consequently in the primary winding 15 of the air-gap transformer, the secondary 13, which undergoes corresponding variations, influences correspondingly the additional winding 12, 12' and consequently the cross flux emitted by the supplementary poles 4, 4'.

The action of the transformer is described below.

It is known that when a sudden disturbance occurs in the circuit supplied by an alternator (short circuit, for instance), a sudden and transient pull of current occurs, not only in the armature winding, but also in the field winding of said alternator. One of the main objects of the present invention is to utilize that sudden current variation in the field in order to increase transiently the tension of the exciter so as to maintain stability of operation of the alternator.

To this end and, as mentioned above, an air-gap transformer is utilized, the primary winding of which is traversed by the variable current delivered by the exciter-generator and the secondary winding of which supplies the additional winding 12, 12' carried on the supplementary poles 4, 4' of said exciter.

If $r$ is the resistance of the circuit comprising the winding 12, 12' and the secondary winding 13 of said transformer, $l$ its total self-inductance and $-m$ the resulting mutual inductance between the said circuit and the primary circuit, $I$ the variable current delivered and $t$ the time, it is known that the electromotive force $$m \cdot \frac{dI}{dt}$$

created in the secondary winding, in the absence of magnetic saturation, is proportional to the rate of variation $$\frac{dI}{dt}$$

of the current $I$ in the rotor. It causes a transient current $i_a$ to flow into the winding 12, 12', said current being connected to $$\frac{dI}{dt}$$

by the relation:

$$ri_a + l \cdot \frac{di_a}{dt} - m \cdot \frac{dI}{dt} = 0$$

The transient electromotive force induced by the flux of the supplementary poles between the auxiliary brush 7 and the main brushes 6, 6' is substantially proportional to the current $i_a$. The transient E. M. F., introduced into the main field coils 3, 3' connected to the auxiliary brush 7, insures a rapid increase of the exciting current in said coils and therefore of the exciting tension of the alternator.

Building up of the current $i_a$ in the secondary winding of the transformer is extremely rapid as will be seen hereafter.

As a matter of fact, if the resistance $r$ of the above mentioned circuit is low (high time constant), the above relation becomes approximately:

$$l \cdot \frac{di_a}{dt} = m \cdot \frac{dI}{dt}$$

whence we get:

$$\frac{di_a}{dt} = \frac{m \cdot dI}{l \; dt}$$

which shows that the current variations in the secondary winding of the transformer are a true reproduction of the current variations in the primary winding, the result of which is an effect of rapid excitation of the supplementary poles, according to the load variations of the alternating current generator.

An exactly reverse effect is obtained in the case when, in consequence of a break in the system for instance, the current in the rotor of the alternator undergoes a sudden and spontaneous reduction.

The above mentioned effect being essentially transient, the usual voltage regulator comes thereafter and brings its correction effect, confirming the excitation variation thus obtained.

The size of the air-gap transformer 14 used should obviously be so chosen that the mutual inductance between its primary and secondary windings will be greater than and opposite to the mutual inductance between the windings 11, 11' and 12, 12', and that the difference between the said mutual inductances will be equal to $-m$; furthermore, as discussed above, it may be desirable to make supplementary poles 4, 4' and the additional winding 12, 12' of such size that the time constant of said winding will be relatively high.

The embodiment shown in Fig. 2 differs from that shown in Fig. 1 in that the generator is provided with two auxiliary brushes instead of one. These brushes are connected respectively to one end of the field windings 3, 3' of the main poles 2, 2', which windings have their other end connected to the terminals of the machine.

In this case, it is the transient E. M. F., induced by the supplementary poles 4, 4' between the two auxiliary brushes 7, 7' and which is again proportional to the transient current $i_a$ traversing the additional winding 12, 12', which is introduced into the circuit of the main coils 3, 3', thereby insuring a rapid increase of the exciting current which traverses said circuit, and consequently of the terminal voltage of the generator.

The embodiment shown in Fig. 3 is a four brush generator similar to that of Fig. 2—the reference numbers designate the same or corresponding members—the main excitation of which, however, is a separate excitation supplied by an exciter 18, connected as shown in the drawing. Each of the two auxiliary brushes 7, 7' is respectively connected to the end of the main field winding 3, 3', which is on the other hand connected to the exciter 18 across regulator 9.

Obviously, if instead of two auxiliary brushes the above described generator was provided with a single one, that brush should be connected to one of the ends of the main field winding 3, 3', the opposite end being connected to one of the main brushes 6, 6' or to the main terminals of the machine.

Although, generally speaking, the low value of the current conducted by the auxiliary brushes 7, 7' appreciably facilitates commutation insofar as they are concerned, such commutation can be still further improved by various means.

For one thing, a slot may be provided in the main pole opposite the turns of the armature winding wherein commutation takes place.

For another thing, the auxiliary brush or brushes may be shifted to a certain extent so that such shifting brings the turns of the armature winding about to be commutated into a region where the field is weak, and such shifting is particularly advantageous for the purpose intended.

As a matter of fact, when the axis of commutation under the brushes 7, 7' coincides with the axis of the main poles 2, 2', the electromotive force induced between said brushes will be produced solely by the flux engendered by the combined action of the armature reaction of the main current and the magnetomotive forces produced by the windings 11, 11' and 12, 12'. If, on the other hand, the brushes 7, 7' are shifted, the electromotive force induced between them will also include a component proportional to the flux issuing from the main poles 2, 2', thus serving to introduce a shunt excitation component.

Finally, as shown in Fig. 4, each of the main field poles 2, 2' may be subdivided into two half-poles 2a, 2b, disposed symmetrically with respect to the commutation axis, in auxiliary brushes 7, 7' (this latter not shown), which axis in this case, is of course assumed to coincide with the axis of the said poles.

When recourse is had to such subdivision of the main poles, an auxiliary commutation pole 2c may be interposed between the two half-poles 2a, 2b and an arrangement provided wherein said auxiliary pole carries no winding, whereas each field half-pole carries both a winding 3a, 3b of its own, and a winding 3c which is common to the whole unit, the windings 3a, 3b and 3c being mounted in series connection and connected to the auxiliary brush 7. Said windings 3a, 3b and 3c are coiled in the same direction, but the windings 3a and 3b, acting in the same direction as the winding 3c under the half-poles 2a and 2b, act in opposite direction to said winding 3c in the space between said half-poles and particularly in the auxiliary pole 2c, tending to cause a flux to flow therein in a direction opposite to that of the flux which they produce in said half-poles 2a and 2b (return flux). In such case, the magnetomotive force which will act in the commutation zone will be equal to the difference of the magnetomotive forces due respectively to the sum of the individual windings of the two half-poles, on the one hand, and to the common winding, on the other hand. Of course, the arrangement is the same for the second main pole of the pair 2, 2'.

Naturally, even if the commutation conditions under the main brushes 6, 6' are favorable due to the presence of the winding 11, 11', it may, in certain cases, be advantageous to use a similar arrangement for the cross poles 4, 4'.

According to another aspect of the invention, it is furthermore possible to select the characteristics of a generator answering the above formulated general definition so that said generator shows a more or less rapid response effect, simultaneously with a great amplification factor, the latter being defined as the ratio of the output of the generator to the power consumed in the excitation windings acting along the axis 6—6'.

It has been found especially that in the above mentioned machines, said factor could attain particularly high values, as high as 30,000 and even more.

Of course, if and under the condition that the required characteristics are given to one and the same machine, the latter is rapidly responsive and has, simultaneously, a high amplification factor, one will note, however, that these two properties vary, as it were, in a direction contrary to each other and that in practice one must abide by a single compromise of fact.

This new result is obtained by neutralizing the armature reaction of the delivered current, as in the preceding cases, by a concentrated and/or distributed compensation winding and by exciting the main field coils by a current of medium strength (with this consideration that the excitation can, moreover, be simply separate or partially shunt or compound or multiple or still obtained simply by closing the field winding upon the auxiliary brushes) under a voltage which is sufficiently low in order that it may be possible to give a small value to the flux emitted by the supplementary poles, owing to which it is possible to limit, to values which are also small, the currents of excitation supplied by one or more external sources to the additional windings carried by said supplementary poles, as well as the self-inductance of said windings, these arrangements having for their effect to lower the time constant and the consumption of power in said windings.

If it is desired, in such machines, first of all to obtain a high amplification factor, it is advisable to reduce to a minimum the voltage of excitation of the main field winding as well as the flux passing through the supplementary poles.

If, on the contrary, a great responsive rapidity is desired, it is of interest to insert resistances into the main excitation winding and, if desired, into the additional windings of the supplementary poles thus reducing their time constant, and, consequently, raising the excitation voltage of the main field windings as well as the current supplied to the additional windings, which, of course, reduces the amplification factor accordingly.

If it is desired to use the generator as a means for regulation, the single winding 12, 12' could be replaced by two distinct windings, influenced, the one by a magnitude to be controlled (current, voltage and the like), and the other by a reference magnitude so that the output of said generator would be proportional to the difference existing between said two magnitudes or varying in the same direction as this difference. The additional windings, the number of which can also be higher than two, can also be influenced by two or more magnitudes which are either of the same nature or of different natures (current and voltage, for instance) and between which a predetermined relation is to be maintained. The output of the generator is then a function of these various magnitudes and it can be utilized for regulating the machine or the group of machines to be controlled.

It is obvious that in all of the above mentioned embodiments, certain windings may take the form of windings distributed in slots instead of making them in the form of concentrated windings (like the coils of a usual direct current machine), or even to combine these two forms of windings; the fixed part of the magnetic circuit can also be made in the form of a laminated and slotted cylindrical stator, like the stator of an induction motor Although only two main poles and two supplementary poles have been shown, it is obvious that the machines will be made in most cases with a greater number of poles and that the number of the brush lines will, generally, also be increased.

I claim:

1. Rapid responses, direct current generators, comprising main field poles provided with at least one usual field winding, said winding being traversed by a current of normal excitation other than a series excitation, a normal armature, a commutator and main brushes lying on said commutator at substantially right angles to the axis of said main poles, an even number of supplementary poles interposed between said main poles, a transformer having primary and secondary windings, said supplementary poles carrying one winding traversed by the current delivered by the generator and at least one additional winding in closed circuit with the secondary of said transformer whose primary is traversed by the current delivered by the generator, and at least one auxiliary brush engaging the commutator between the main brushes and connected to the said field winding of the main poles, whereby there is introduced into said winding, already traversed by the said normal excitation current, the stepped-up or stepped-down electromotive force created by the flux engendered by the magnetomotive force produced by the said windings of said supplementary poles in addition to the magnetomotive force which is required for compensating the armature reaction due to the current delivered by the generator.

2. A generator as described in claim 1, in which said field winding of the main poles comprises a large number of turns and is supplied with a small current, whereby the influence exerted by the armature reaction of the exciting current on the flux and on the electromotive force between the main brushes is rendered negligible.

3. In a generator as described in claim 1, main field poles subdivided into half poles, a commutation pole interposed between each pair of half-poles, said commutation pole carrying no winding, each half-pole carrying a winding of its own and a winding common to the whole unit connected to an auxiliary brush.

ROLAND PIERRE
LÉOPOLD MARIE DAVID.

REFERENCES CITED

The following references are of record in the file of this patent:

UNITED STATES PATENTS

| Number | Name | Date |
|---|---|---|
| 1,237,306 | Darker | Aug. 21, 1917 |
| 1,313,272 | Darker | Aug. 19, 1919 |
| 1,843,730 | Pestarini | Feb. 2, 1932 |

FOREIGN PATENTS

| Number | Country | Date |
|---|---|---|
| 23,881 | Great Britain | Oct. 29, 1907 |
| 629,600 | France | Aug. 1, 1927 |
| 803,455 | France | July 6, 1936 |